May 14, 1968

R. L. BROWN 3,383,110

CAPTIVE MANIPULABLE AERIAL AMUSEMENT
DEVICE WITH TARGET MEANS

Filed Sept. 10, 1965

*INVENTOR.*
RICHARD L. BROWN

BY George R Nimmer

ATTORNEY

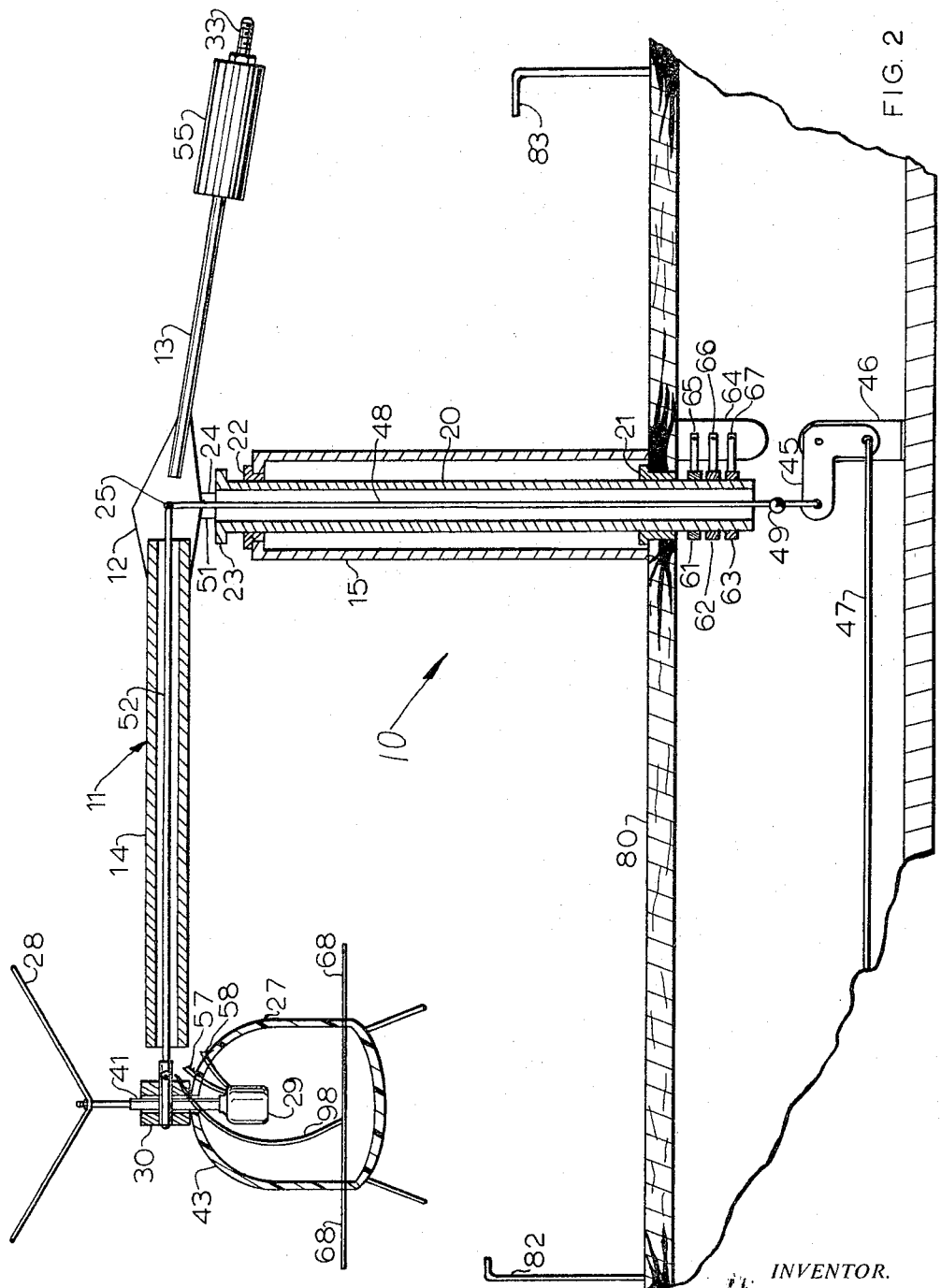

May 14, 1968

R. L. BROWN 3,383,110

CAPTIVE MANIPULABLE AERIAL AMUSEMENT
DEVICE WITH TARGET MEANS

Filed Sept. 10, 1965

*INVENTOR.*
RICHARD L. BROWN

BY George R Nimmer

ATTORNEY

United States Patent Office 3,383,110
Patented May 14, 1968

1

3,383,110
CAPTIVE MANIPULABLE AERIAL AMUSEMENT DEVICE WITH TARGET MEANS
Richard L. Brown, Bellevue, Nebr., assignor to Amusement Engineering Co., Omaha, Nebr., a corporation of Nebraska
Filed Sept. 10, 1965, Ser. No. 486,415
3 Claims. (Cl. 273—95)

ABSTRACT OF THE DISCLOSURE

An amusement device having a helicopter-type aircraft member disposed at one end of a counter-weighted pivoted boom. Thrust producing means are carried by the aircraft member which are tiltable with respect to the aircraft to impart both horizontal and vertical movement to it. Controls are provided for tilting the thrust means and also for controlling the amount of power delivered to the thrust means. A target system is provided which senses the proximity of aircraft to a target member and records the occurrence.

---

This invention relates to captive aerial amusement devices. In particular this invention relates to a highly maneuverable captive aerial apparatus that is admirably adapted for remotely controlled target game embodiments. This application follows my earlier copending patent application Ser. No. 394,427 filed Sept. 4, 1964, now abandoned.

It is an object of the present invention to provide a captive powered aerial device having a carrier member that performs in a manner resembling that of one in free flight.

It is another object of the present invention to provide a captive powered aerial device having controls that may be readily operated either from within the carrier member or from a remote position.

Another object of the present invention is to provide a captive aerial apparatus that will ascend, descend, hover, oscillate, and laterally accelerate or decelerate utilizing any one of a variety of specific thrust means.

It is another object of the present invention to provide a means to control the absolute value of the thrust as well as means to control the vector components thereof.

It is yet another object of the present invention to provide a plurality of sensing targets within the general circumference of the flight path, said targets being adapted to be contacted or otherwise stimulated by the carrier member.

It is another object of the present invention to provide a score keeping device to tally the number of the scoreable contacts made between the carrier member and the stationary targets.

It is another object to provide a miniaturization of the entire concept to render or provide a table model game operatable by remote control.

With the above and other objects in view, which will appear as the description proceeds, this invention resides in the novel construction, combination, and arrangement of parts as hereinafter described and more particularly defined by the appended claims, it being understood that such changes in the precise embodiment of the hereindisclosed invention may be made as come within the scope of the claims.

In the drawing, wherein like numbers refer to like parts in the several views and in which:

2

FIGURE 2 is a sectional elevational view of the captive aerial apparatus skill game taken along line 2—2 of FIGURE 1.

Figure 1:
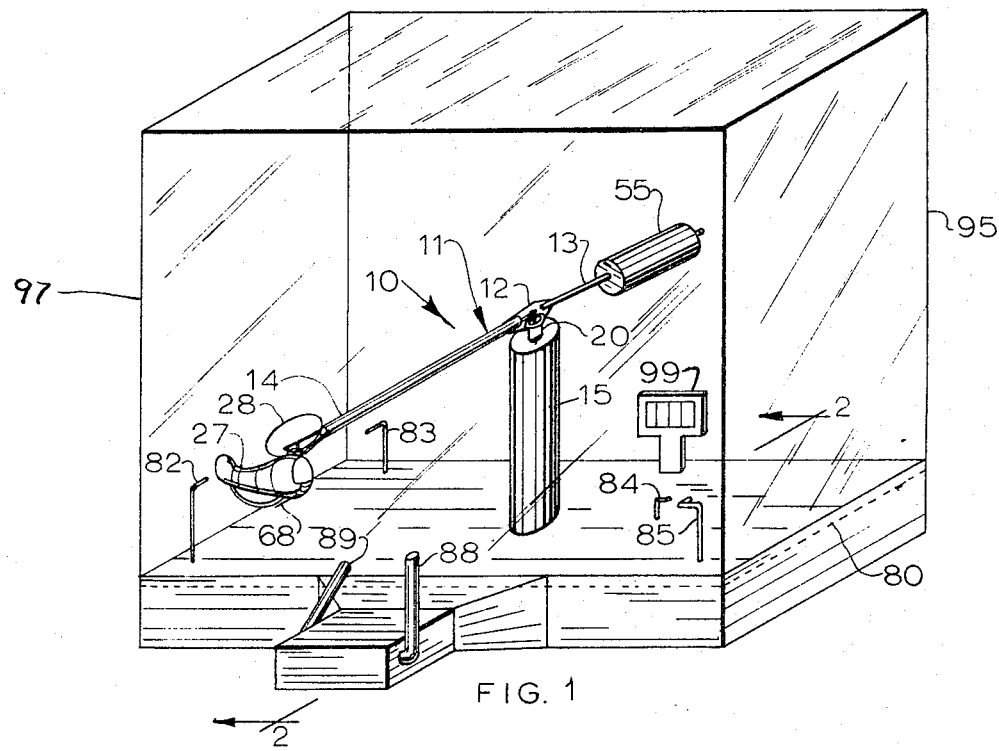
FIGURE 1 is a perspective view of the captive aerial apparatus skill game of the present invention.

As can best be seen in FIGURES 1 and 2, the captive aerial apparatus skill game of the present invention comprises a substantially horizontal base member 80, a plurality of stationary targets 82–85, a captive aerial apparatus 10, and a score keeping device 99.

The captive aerial apparatus 10 portion comprises a unitary elongate boom 11, a central support 15, a rotatable shaft 20, a counterweight 55, a carrier member 27, and an electrically-actuated propeller thrust means 28. Unitary elongate boom 11 comprises two tubular rigid sections, including a counterbalanced section 13 and a driven section 14, said rigid sections 13 and 14 being integrally connected together in a uniplanar relationship by means of a vertical intermediate plate 12 which is at the medial portion of boom 11. The outward terminal portion of driven section 14 may conveniently take the form of a horizontal rigid tongs 34 having convergent pincers 35 and 36.

Figure 5:
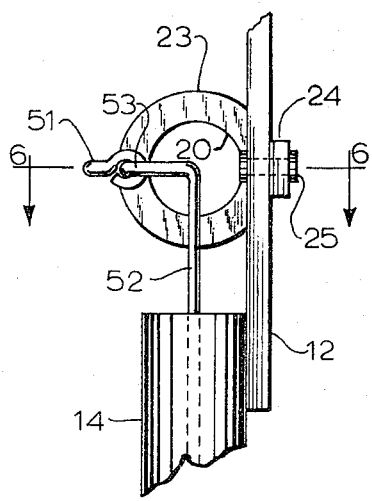
FIGURE 5 is a detail plan view showing the pivotal connection between the rotatable vertical shaft and the medial portion of the elongate boom.
Figure 6:
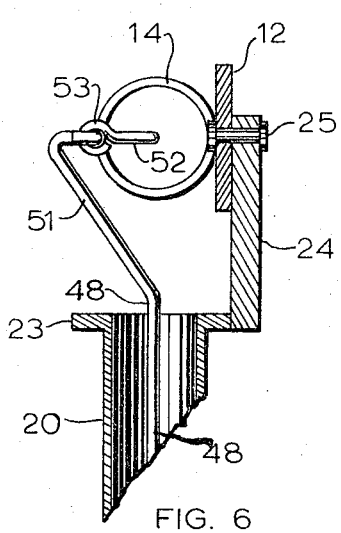
FIGURE 6 is a sectional elevational view taken along line 6—6 of FIGURE 5.

A central support 15 of tubular shape is uprightly and fixably attached upon a central portion of base 80. Support 15 surrounds a vertical rotatable tubular shaft 20 of circular cross-sectional shape. Rotatable shaft 20 passes through a central perforation of base member 80 and a lower portion thereof extends below base member 80. A lower portion of shaft 20 is journalled by a bushing 21 held within the central perforation of base 80. Tubular shaft 20 extends above central support 15, and an upper portion of shaft 20 is journalled by a bushing 22 held within the upper terminal portion of tubular support 15. As can best be seen in FIGURES 5 and 6, the upper end of rotatable shaft 20 is integrally provided with a collar 23 and an upright bar 24 is integrally attached to collar 23. A central pivot as a horizontal pivot pin 25 passes through upright bar 24 and boom plate 12 so as to pivotably attach the medial portion of boom 11 to rotatable vertical shaft 20. Thus, as the vertical tubular shaft 20 is rotated about its longitudinal vertical axis, elongate boom 11 will also rotate about the same longitudinal vertical axis. Further, the elongate boom 11 will pivot, with respect to shaft 20, within a single plane passing along the vertical longitudinal axis of shaft 20 and perpendicular to the longitudinal axis of horizontal pivot pin 25. The aforesaid rotatable and pivotal disposition of unitary elongate boom 11 allows any point along boom sections 13 and 14 to circumscribe an infinite number of circles about central pivot 25.

There is a weighty carrier member 27 which is pivotably attached to driven section 14 so that carrier member 27 is free to pivot within a plane defined as substantially passing through the longitudinal axes of said vertical rotatable shaft and the unitary elongate boom. Because of the weight of carrier member 27, it will normally swing outwardly from shaft 20 as shaft 20 and associated elongate boom 11 rotate. While, for reasons to be explained later, it is desirable that carrier member 27 be hollow, any weighty mass is generally suitable for the carrier member. Because the carrier member is a portion of the captive aerial device 10, it is preferable that the carrier member have the form of an aircraft such as an airplane, a rocket, or a helicopter as shown in the drawing. The center of gravity of the carrier member 27 is located below its pivotal connection with elongate boom 11.

There are tiltable thrust means to cause the carrier member 27 to be thrust generally upwards so as to cause the driven section 14 of unitary elongate boom 11 to rise. Further, said thrust means being tiltable will give an oblique thrust to carrier member 27, the horizontal vector of the oblique thrust causing elongate boom 11 and its associated shaft 20 to rotate. Tiltable thrust means, with its resultant horizontal and vertical force vectors, causes the carrier member 27 to raise and lower about pivot pin 25 while rotating about the central axis of shaft 20. As will be pointed out later, there are means to vary the thrust magnitude. Thus, a tiltable thrust means of variable total magnitude will enable the carrier member to be maneuvered at various speeds and oscillations about pivot pin 25. While fluid jets could be employed to equal advantage, propeller thrust means driven by an electric motor or an internal combustion motor are preferred. In the drawing a single propeller blade 28 driven by an electric motor 29 is shown as the preferred embodiment.

Whatever precise thrust means embodiment to be employed, it is essential that the thrust means be tiltable to deliver thrust in a plane substantially defined as passing through the pivotal connection between the carrier member and the boom driven section and tangent to any circle circumscribable by said pivotal connection. This condition, together with a carrier member that is free to pivot within a plane passing through the vertical longitudinal axes of said vertical elongate shaft and the unitary elongate boom, can be provided in many ways; however, the preferred means of providing these conditions are as follows.

Figure 3:
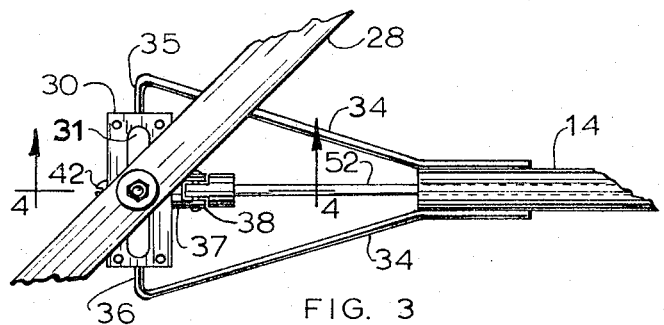
FIGURE 3 is a detail plan view showing the pivotal connection between the elongate boom driven section and the carrier member.
Figure 4:
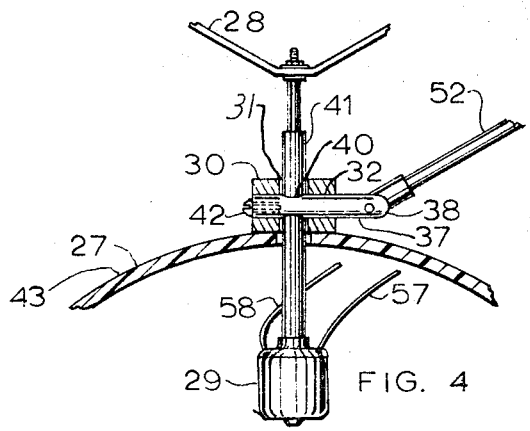
FIGURE 4 is a detail elevational view of the pivotal connection shown in FIGURE 3.

As shown in FIGURES 2–4, inclusively, there is an elongate rectangular block 30 having parallel rectangular upper and lower surfaces, two parallel rectangular sides, and two parallel rectangular ends. Horizontal block 30 is provided with a substantially vertical longitudinal slot 31 therethrough, said slot 31 intersecting the upper and lower surfaces of block 30. The elongate side-walls of slot 31 are parallel to each other and to the rectangular sides of block 30. There is a transverse circular perforation 32 through block 30, said perforation 32 being perpendicular to and intersecting slot 31 and the parallel rectangular sides of block 30. Block 30 is pivotably attached to driven section 14 by means of tongs 34, pincers 35 and 36 piercing into the center of the parallel ends of block 30. Thus, the horizontal longitudinal central axis of block 30 is substantially perpendicular to the longitudinal axis of elongate boom 11, and block 30 is free to pivot about its own longitudinal axis.

Figure 7:
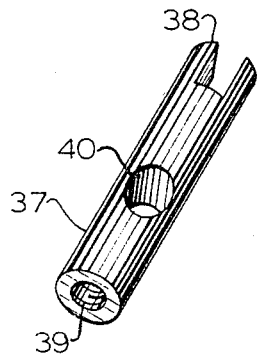
FIGURE 7 is a perspective view of the lug component.

As can best be seen in FIGURE 7, there is a revolvable lug member 37 located within transverse perforation 32. One end of lug 37 is provided with a vertically aligned clevis 38. Another end of lug 37 is provided with a threaded perforation 39 along the longitudinal central axis of lug 37. Intersecting threaded perforation 39 is a vertical perforation 40 through lug 37.

The electrically driven propeller thrust means includes an electrical motor 29 and an elongate propeller blade 28 of fixed pitch, a medial portion of blade 28 being perpendicularly attached to the integral rotatable shaft of motor 29. There is a rotationally-fixed, tubular housing 41 that is bolted or otherwise fixedly attached to motor 29 so as to surround the motor shaft. Housing 41 passes through hole 40 of lug 37 and also through slot 31 upwardly beyond block 30. A set screw 42, threadedly engaged by perforation 39 of lug 37, holds the tubular housing 41 of motor 29 slidably within slot 31 of block 30. The hollow carrier member as helicopter 27 surrounds motor 29; block 30 abutting against roof 43 of carrier member 27 maintains the carrier member in the required pivotal relationship to the longitudinal axes of shaft 20 and elongate boom 11. Further, the revolvable relationship of lug 37 within transverse hole 32 and the slidability of motor shaft housing within slot 31 allow the thrust means to pivot within that plane passing through the pivotal connection 35 and 36 between the carrier member 27 and the elongate boom 11 and also tangent to any circle circumscribably by the said pivotal connection between the carrier member 27 and the boom driven section 14. The precise means for slidably tilting the motor shaft housing 41 within longitudinal slot 31 will now be explained.

Positioned along one side of base member 80 are a pair of levers 88 and 89. Lever 88 and intermediate linkage control the degree and direction of the slidable movement of motor shaft housing 41 within slot 31. The linkage comprises elongate rod 47 and L-shaped bell crank 45 beneath base member 80, the corner of said bell crank 45 being pivotably attached to an upright standard 46. A lower elongate horizontal rod 47 is rigidly attached between lever 88 and the vertical arm of bell crank 45 so that mechanical actuation of lever 88 causes the horizontal arm of bell crank 45 to move vertically. The lower end of an elongate vertical rod 48 surrounded by shaft 20 is connected to the horizontal arm of bell crank 45 with swivel 49. As can best be seen in FIGURES 5 and 6, the upper end 51 of vertical rod 48 extends beyond collar 23 on shaft 20 and is bent outwardly of pivot pin 25. Upper end 51 of vertical rod 48 is provided with an eyelet perforation. The final member of the linkage is torsion bar 52, one end of which is pivotably connected within clevis 38 of lug 37; the other end of torsion bar 52 is a hook 53 which engages the eyelet end 51 of vertical rod 48. Thus, as lever 88 is moved forwardly, for example, lower rod pushes against the vertical arm of bell crank 45, moving the horizontal arm thereof and vertical rod 48 downwardly; as this occurs, the upper end 51 of rod 48 twists torsion bar 52 which bears against clevis 38 to twist lug 37 and slide motor shaft housing 41 along slot 31. Obviously, as lever 88 is moved rearwardly, vertical rod 48 moves upwardly to twist torsion bar 52 in the opposite direction causing the motor shaft housing to slide along slot 31 in the opposite direction. Because of the swivel connection 49 between vertical rod 48 and bell crank 45, vertical rod rotates freely along with shaft 20 and carrier member 27.

There is a counterweight 55 as a cylindrical block of metal that is axially threadedly engaged with counterbalance section 13 near the terminus 33 thereof. It is essential that the so counterweighted section be so disposed to the integrally attached driven section 14 that the center of gravity of the entire boom 11 together with the combined dead weights of the carrier member and the thrust means is located below the horizontal plane of central pivot 25 when the elongate boom medial portion is horizontal. For this reason, counterbalance section 13 extends slightly downward from central pivot 25. If interchangeable carrier members of different weights are to be used, then a counterweight which is threadedly movable along boom section 13 may be employed to exactly balance the movement of the carrier member and the thrust means at rest.

The electric motor 29 is motivated by electrical wires 57 and 58 leading from said motor 29, through roof 43 of carrier member 27 (as seen in FIGURE 4), along the boom's driven section 14, downwardly along the internal portion of vertical shaft 20 and through the lower end thereof, and thence connected to rings 61 and 62, said rings being electrically insulated from shaft 20. Rings 61 and 62 are energized by rotating contact with brush elements 65 and 66, respectively, said brush elements being mounted to a bracket 64 attached to the underside of base member 80. The electrical wire 57 from brush 65 proceeds to an electrical outlet (not shown). That electrical wire 58 from brush 66 proceeds to plug 59 via a rheostat concealed within the housing for levers 88 and 89; lever 89 is employed to actuate the rheostat and thus ultimately control the speed of propeller blade 28.

Thus far has been described a highly maneuverable captive aerial apparatus 10, the carrier member 27 of which is controlled by the combination of levers 88 and 89, lever 89 determining propeller speed while lever 88 determines direction of thrust. Normally, the operator of the skill testing amusement device controls lever 88 with the right hand and lever 89 with the left hand. The revolvable speed about shaft 20 is determined by propeller speed and by the horizontal thrust vector. Vertical speed and acceleration of carrier member 27 is determined by propeller speed and by the vertical thrust vector. A well coordinated operator, holding levers 88 and 89 in his hands, is able to exert a high degree of control and manipulation over the movement of carrier member 27. Measurement of the operator's coordination is determined with a plurality of stationary targets 82–85 uprightly supported above the upper surface of game board 80, together with some convenient means for recording the number of "contacts" made between the carrier member and the several targets within a given period of time. "Contact" between the targets and carrier member is not restricted to actual physical contact between the two. For example, if the targets are as photoelectric cells and the carrier member carries a light source, or vice versa, mere proximity between the two would constitute stimulation between the two. Preferably, the several targets should be of different heights above game board 80 and at varying distances outwardly from the carrier members pivot point 40 just to make the game more interesting.

Figure 8:
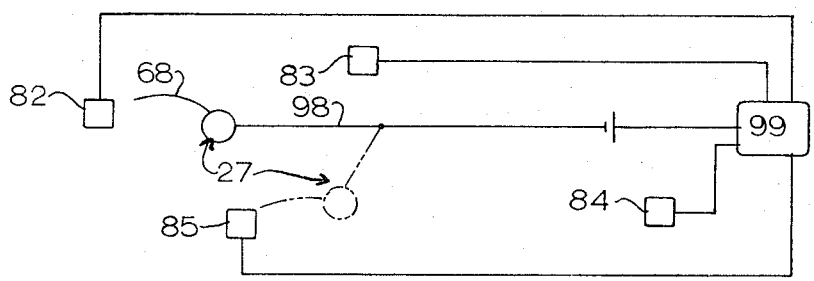
FIGURE 8 is a schematic view showing the electrical circuitry between the carrier member, the stationary targets, and the score keeping device.

While mechanical means are acceptable to register the number of contacts made between the carrier member 27 and the respective stationary targets within a given period of time, electrical means are preferred. Each of the targets 82–85 has an electrically conductive exterior and the target may comprise an electrically-conductive wire some of which may be bent or screwed to make the game more interesting. The lower end of each wire target pierces the game board, and as can be seen in FIGURE 8, an electrical wire leads from every target to conventional score keeping device 99 and thence to one terminal of an exterior power source. The other terminal of the exterior power source proceeds to brush 67 on bracket 64. Brush 67 is in slidable electrical contact with a ring 63 mounted on and electrically isolated from shaft 20 in an identical manner to rings 61 and 62. An electrical lead 98 proceeds from ring 63, thence internally along shaft 20, and following the path of electrical leads 57 and 58, and finally connected to an electrically conductive portion of carrier member 27, herein as a pair of whisker-like wires 68. Thus, if one of the electrically conductive whiskers 68 should contact one of the stationary targets 82–85, then an electrical circuit is completed through a score keeping device 99.

A very desirable feature of the invention includes a hood member overlying the base member 80, the targets, and the captive aerial apparatus, to protect the system from exterior dirt, tampering, and other exterior damage. Scoreboard 99 should be so positioned so as to be viewable from the general direction of levers 88 and 89 so that the operator may view the accumulated score at any point of time. Thus, the front portion 97 of the overlying hood 95 is transparent.

Operation of the device has been heretofore alluded to, but will be summarized as follows. The operator manually grasps handle levers 88 and 89 with the left and right hands, respectively. Lever 89 is manipulated so as to allow the desired amount of current to flow through leads 57 and 58 to electric motor 29 and govern the amount of thrust, herein as the speed of propeller blade 28. Except when the direction of thrust is perfectly vertical (blade 28 being horizontal), the thrust is resolved into two vectors, vertical and horizontal, to cause carrier member 27 to simultaneously rise and rotate clockwise or counterclockwise about the vertical axis of shaft 20. Lever 88 is manipulated to tilt the thrust within the aforedefined "tangent plane" to vary the ratios of the horizontal and vertical thrust vectors and thus control the speed and direction of the carrier member 27 about the vertical axis of shaft 20. Thus, the carrier member 27 is readily manipulatable and maneuverable so that the electrically conductive portions thereof e.g. whiskers 68, will stimulate one or more of stationary targets 82–85 in sequence to register a tally on scoreboard 99.

Further, the motor 29 conveniently utilized is 10,000 r.p.m. and 1/100 horsepower. Finally, it should be pointed out that the speed control lever 89 (and its rheostat) is merely a desirable though a non-essential part of the control mechanism. A measure of vertical or oscillatory movement as well as revolvable movement about the vertical axis of shaft 20 will result from a constant thrust that is tiltable so as to govern the horizontal and vertical thrust vectors. Obviously, the speed and tilt of the thrust means e.g. 29, could be controlled from within carrier member 27 if the captive aerial apparatus 10 is sufficiently large to carry a passenger.

From the foregoing, the construction and operation of the captive aerial apparatus skill game will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A captive aerial apparatus amusement device particularly adapted for a skill game comprising in combination: at least one target, a captive aerial apparatus having a captive carrier member component adapted to travel in a controlled flight path, and a score keeping device for sensing the proximity of said carrier member component to the said target, said captive aerial apparatus portion comprising a central support including a vertical rotatable shaft portion; a unitary elongate boom, a medial portion of which is attached to the central support rotatable shaft with a central pivot so that the elongate boom is freely rotatable with the rotatable shaft, said elongate boom being pivotal in a single vertical plane passing along the longitudinal axes of the rotatable shaft and the elongate boom, said central pivot defining the boundary between a counterbalance section and a driven section of said unitary elongate boom, every point along the respective counterbalance and boom sections thus being free to define an infinite number of circumscribable circles; a carrier member, pivot means pivotably attaching said carrier member to said driven section, said second pivot means allowing said carrier member to pivot freely away from the central pivot within a plane passing through the longitudinal axes of said vertical rotatable shaft and the unitary elongate boom, said carrier member component being disposed below the boom; thrust means carried by said carrier member, means for mounting said thrust means for tilting thereof with respect to said carrier member in a plane substantially defined as passing through the pivotal connector joining the carrier member to the boom and tangent to any circle circumscribable by the said pivotal connection between the carrier member and the boom driven section; a counterweight attached to the counterbalance section of said elongate boom, the weight and position of the so counterweighted section being so disposed to the integrally attached driven section so that the center of gravity of the entire elongate boom together with the dead weights of the carrier member and the thrust means is located below the horizontal plane of the central pivot when the boom medial portion is in the horizontal position; and a dual handle means remote of the carrier member for controlling the flight path of the carrier member, one of said handle means being adapted to the control the degree of thrust delivered by the thrust means, the other of said handle means being adapted to tilt the thrust means with respect to the carrier member.

2. A captive aerial apparatus amusement device particularly adapted for a skill game comprising in combination a plurality of stationary targets, a captive aerial apparatus having a captive carrier member component adapted to travel in remotely controlled flight path, and a score keeping device for indicating the number of successive contacts made between said captive carrier member components and said stationary targets; said targets, captive aerial apparatus, and score keeping device being attached within a housing having a substantially horizontal base member and an overlying hood therefor, a portion of the overlying hood which is located in between the score keeping device and the remote control means for the captive aerial apparatus being substantially visibly transparent; said stationary targets being supported by and extending above the base member, each of said targets having an electrically conductive exterior portion that is electrically connected in parallel to said score keeping device, said captive aerial apparatus comprising:

A. a stationary upright tubular central support attached to and extending above the base member, a rotatable vertical shaft axially positioned within the upright central support, the upper portion of said rotatable shaft extending above and journalled by the central support, the lower portion of said rotatable shaft extending below and journalled by the base member, the upper terminal portion of said rotatable shaft being provided with a collar to which is attached an upright bar;

B. a unitary elongate boom comprising two distinct elongate sections including a tubular driven section and a tubular counterbalance section, said two boom sections being attached together in a rigid uniplanar relationship with an intervening vertical plate section, the outward terminus of the driven section having convergent pincers, the intervening medial plate being attached to the rotatable shaft upright bar with a horizontal pivot pin so that the elongate boom is freely rotatable with the rotatable shaft, said elongate boom being pivotal within that plane common to the driven and counterbalance sections, every point along the driven and counterbalance sections being free to define an infinite number of circumscribable circles;

C. an elongate block pivotably attached between the convergent pincers of the driven section, said pivotal elongate block having a vertical central slot therethrough between the convergent pincers, said elongate block having a transverse perforation therethrough which intersects the central slotted portion, a lug member revolvably positioned within the transverse perforation and extending from the elongate block toward the central support, said lug member being vertically perforated in alignment with the elongate block central slot; a propeller thrust means attached to the rotatable shaft of an electrically driven motor, said motor having an integral housing that surrounds a portion of its rotatable shaft, said motor being disposed below the elongate block and its shaft housing upwardly extending through lug vertical perforation and the elongate block vertical slot, said motor shaft housing being attached to the revolvable lug so that the motor shaft and its housing are tiltable within the elongate block vertical slot in a plane substantially defined as passing through the pincers and tangent to any circle circumscribable thereby;

D. a carrier member extending downwardly from the boom driven section, the roof of the carrier member being positioned between the electrical motor and the horizontal elongate block so that said carrier member is free to pivot away from the central pivot within a plane passing through the longitudinal axes of said vertical rotatable shaft and the unitary elongate boom, said carrier member having an electrically conductive exterior portion that is electrically connected to said score keeping device;

E. a cylindrical counterweight axially threadedly engaged to the counterbalance section near the outward terminus thereof, said counterbalance section extending downwardly from the central pivot so that the center of gravity of the entire elongate boom including the dead weights of the carrier member and the thrust means is located below the horizontal plane of the central pivot when the boom intervening plate is in the horizontal position;

F. a dual handle means for remotely controlling the flight path of the carrier member, said remote control means being positioned externally of the housing, one of said handle means actuating a rheostat to control the speed of said electrical motor and the thrust delivered by the propeller, the other of said handle means actuating an elongate rod beneath the base member which vertically slides a push rod that is contained axially along and extends upwardly beyond the vertical elongate shaft, said push rod adapted to twist a torsion bar connected between the push rod and the lug member so that the propeller thrust means is tiltable within a plane substantially defined as passing through the pincers pivotal connection between the carrier member and the elongate boom driven section and tangent to any circle circumscribable by said pincers.

3. A captive aerial apparatus amusement device particularly adapted for a skill game comprising in combination: at least one target, a captive aerial apparatus having a captive carrier member component adapted to travel in a controlled flight path, and a score keeping device for indicating the proximity of said carrier member component to the said target, said captive aerial apparatus portion comprising a central support including a vertical rotatable shaft, a unitary elongate boom a medial portion of which is attached to the rotatable shaft with a central pivot so that the elongate boom is freely rotatable with the rotatable shaft, said elongate boom being pivotal in a vertical plane passing along the longitudinal axes of the rotatable shaft and the elongate boom, said central pivot defining the boundary between a counterbalance section and a driven section of said elongate boom, a carrier member, pivot means for attaching said carrier member to said driven section and allowing said carrier member to pivot freely away from the central pivot, thrust means carried by said carrier member, means for mounting said thrust means with respect to said carrier member, a counterweight attached to the counter balance section of said elongate boom, the weight and position of the so counterweighted section being so disposed with respect to the driven section that the center of gravity of the entire elongate boom together with the dead weights of the carrier member and the thrust means is located below the central pivot when the boom medial portion is in the horizontal position; and a dual handle means remote of the carrier member for controlling the flight path of the carrier member, one of said handle means being adapted to control the degree of thrust delivered by the thrust means, the other of said handle means being adapted to tilt the thrust means with respect to the carrier member.

References Cited

UNITED STATES PATENTS

| | | | |
|---|---|---|---|
| 2,216,278 | 10/1940 | New. | |
| 2,392,721 | 1/1946 | Burlin | 46—131 |
| 2,404,014 | 7/1946 | Thornes | 244—17.25 |
| 2,569,882 | 10/1961 | De Bothezat | 244—17.25 |
| 2,942,880 | 6/1960 | Bennett | 272—31 |
| 2,987,272 | 6/1961 | Vogt | 244—17.25 |
| 3,136,543 | 6/1964 | Merl et al. | 272—31 |

FOREIGN PATENTS 695,062   8/1953   Great Britain.

ANTON O. OECHSLE, *Primary Examiner.*

M. R. PAGE, *Assistant Examiner.*